F. O. JAQUES, Jr.
COMBINED TAP AND DRILL GAGE.
APPLICATION FILED MAR. 30, 1911.

1,093,331.

Patented Apr. 14, 1914.

WITNESSES:
INVENTOR:
Fernando Oscar Jaques, Jr.,
by Chas. H. Luther
ATTORNEY.

UNITED STATES PATENT OFFICE.

FERNANDO OSCAR JAQUES, JR., OF CRANSTON, RHODE ISLAND, ASSIGNOR, BY MESNE ASSIGNMENTS, TO LOUIS SHELDEN MOULTHROP, OF PROVIDENCE, RHODE ISLAND.

COMBINED TAP AND DRILL-GAGE.

1,093,331. Specification of Letters Patent. Patented Apr. 14, 1914.

Application filed March 30, 1911. Serial No. 617,922.

*To all whom it may concern:*

Be it known that I, FERNANDO OSCAR JAQUES, Jr., a citizen of the United States, residing at Cranston, in the county of Providence and State of Rhode Island, have invented a new and useful Improvement in Combined Taps and Drill-Gages, of which the following is a specification.

In the usual construction of taps for cutting internal screw-threads, the taps are not usually marked or numbered for size and if the taps were so marked, the markings or numbers would wear off in time or become clogged up with dirt and grease so as to be undecipherable. It is a common occurrence in machine shop practice, for taps to be broken and work destroyed, by boring the wrong size hole for the tap, because the machinist has no permanent accurate gage that will give him the exact size of drill for the required tap, or vice versa.

The object of my invention is to improve the construction of a tap, whereby the tap is provided with a drill gage adapted to gage a drill corresponding in size with the tap.

A further object of my invention is to provide a tap with a drill gage formed integral with the tap.

My invention consists in the peculiar and novel construction of a combined tap and drill gage having details of construction, as will be more fully set forth hereinafter and claimed.

Figure 1:
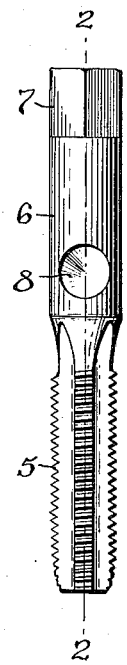
Figure 2:
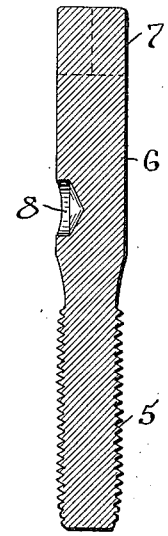

Figure 1. is a side view of my combined tap and drill gage. Fig. 2. is a longitudinal sectional view taken on line 2. 2. of Fig. 1. through the tap and gage, and Fig. 3. is a longitudinal sectional view similar to Fig. 2. of a modified form of tap and gage.

Figure 3:

In the drawings, 5. indicates a conventional form of a tap having the usual shank 6. and square end 7. A drill gage 8. is formed integral with the tap by boring into the side of the shank 6. as shown in Figs. 1. and 2. or into the end of the shank 6. as shown in Fig. 3. with a drill, having the exact size of the hole to be bored for the tap, thereby forming a gage in the form of a round shallow depression having a cone shaped bottom in the side or end of the shank, said gage having the exact size and shape of the end of the drill.

When the tap is in use, the gage is in the most convenient position for use and when a drill is accurately gaged, the machinist is absolutely certain to use the right drill in boring the hole for the tap, thereby eliminating the breaking of taps and the destroying of work, by boring the wrong size hole for the tap.

Having thus described my invention I claim as new and desire to secure by Letters Patent:—

A tap having a shank provided with a drill gage formed of a circular cavity having a cone-shaped bottom and conforming to the pointed end of a twist drill.

In testimony whereof, I have signed my name to this specification in the presence of two subscribing witnesses.

FERNANDO OSCAR JAQUES, JR.

Witnesses:
CHAS. H. LUTHER,
JOHN H. McNULTY.

---

Copies of this patent may be obtained for five cents each, by addressing the "Commissioner of Patents, Washington, D. C."

Correction in Letters Patent No. 1,093,331.

It is hereby certified that Letters' Patent No. 1,093,331, granted April 14, 1914, upon the application of Fernando Oscar Jaques, Jr., of Cranston, Rhode Island, for an improvement in "Combined Taps and Drill-Gages," was erroneusly issued to Louis Shelden Moulthrop as assignee of the entire interest in said improvement, whereas said Letters Patent should have been issued *the inventor, said Jaques, Jr., and Louis Shelden Moulthrop*, said Moulthrop being assignee of *one-half* interest only in said invention as shown by the records of assignments in this office; and that the said Letters Patent should be read with this correction therein that the same may conform to the record of the case in the Patent Office.

Signed and sealed this 19th day of May, A. D., 1914.

R. F. WHITEHEAD,

*Acting Commissioner of Patents.*

[SEAL.]